US011583847B2

(12) United States Patent
Cadotte, Jr. et al.

(10) Patent No.: US 11,583,847 B2
(45) Date of Patent: Feb. 21, 2023

(54) PIPETTE WITH ENCAPSULATED OR INTEGRAL FILTER, AND METHOD AND APPARATUS FOR FORMING SAME

(71) Applicant: CORNING INCORPORATED, Corning, NY (US)

(72) Inventors: John Claude Cadotte, Jr., Waterboro, ME (US); Venu Krishna Pillai, North Andover, MA (US); Michael Kurt Schaefer, Gorham, ME (US); James Mark Seymour, Portland, ME (US)

(73) Assignee: Corning Incorporated, Corning, NY (US)

( * ) Notice: Subject to any disclaimer, the term of this patent is extended or adjusted under 35 U.S.C. 154(b) by 350 days.

(21) Appl. No.: 16/767,349

(22) PCT Filed: Nov. 28, 2018

(86) PCT No.: PCT/US2018/062901
§ 371 (c)(1),
(2) Date: May 27, 2020

(87) PCT Pub. No.: WO2019/108688
PCT Pub. Date: Jun. 6, 2019

(65) Prior Publication Data
US 2020/0398264 A1 Dec. 24, 2020

Related U.S. Application Data

(60) Provisional application No. 62/592,914, filed on Nov. 30, 2017.

(51) Int. Cl.
*B01L 3/02* (2006.01)
*B29C 49/04* (2006.01)
(Continued)

(52) U.S. Cl.
CPC .............. *B01L 3/0213* (2013.01); *B29C 49/04* (2013.01); *B29C 49/16* (2013.01);
(Continued)

(58) Field of Classification Search
CPC ............. B01L 3/0213; B01L 2300/068; B01L 2300/0832; B29C 49/04; B29C 49/20;
(Continued)

(56) References Cited

U.S. PATENT DOCUMENTS 3,891,392 A 6/1975 Betts et al.
4,872,827 A * 10/1989 Noda .................. B29C 49/4823
249/141
(Continued)

FOREIGN PATENT DOCUMENTS

CN 1259878 A 7/2000
CN 201572652 U 9/2010
(Continued)

OTHER PUBLICATIONS

International Search Report and Written Opinion of the International Searching Authority; PCT/US2018/062901; dated Mar. 15, 2019; 19 Pages; European Patent Office.
(Continued)

*Primary Examiner* — Robert B Davis
(74) *Attorney, Agent, or Firm* — Michael G. Panian

(57) ABSTRACT

Measuring pipettes including integral or encapsulated filters, as well as methods and apparatuses for forming the same, are provided. A filter material (e.g., a discrete element in solid form) or a filter material precursor (e.g., a foamable thermoplastic composition and a blowing agent) to be introduced into a hollow interior of a softened thermoplastic material present within a mold during pipette fabrication. A pipette includes a filter element comprising foamed polymeric material within a mouthpiece region, wherein an outer
(Continued)

portion of the filter element is bound to or encapsulated in an inner wall of the mouthpiece region. A filter material precursor may be supplied coaxially with a tubular flow of thermoplastic material into the mold, may be supplied laterally through a mold wall, or may be injected into a molten thermoplastic pipette forming material upstream of an extruder outlet.

31 Claims, 8 Drawing Sheets

(51) Int. Cl.
  *B29C 49/16* (2006.01)
  *B29C 49/02* (2006.01)
  *B29C 49/20* (2006.01)
  *B29K 23/00* (2006.01)
  *B29K 25/00* (2006.01)
  *B29K 701/10* (2006.01)

(52) U.S. Cl.
  CPC .............. *B01L 2300/0681* (2013.01); *B01L 2300/0832* (2013.01); *B29C 2049/023* (2013.01); *B29C 2049/2008* (2013.01); *B29C 2049/2069* (2013.01); *B29K 2023/12* (2013.01); *B29K 2025/06* (2013.01); *B29K 2701/10* (2013.01)

(58) Field of Classification Search
  CPC .... B29C 2049/2008; B29C 2049/2069; B29C 51/12
  See application file for complete search history.

(56) References Cited

U.S. PATENT DOCUMENTS

| | | | |
|---|---|---|---|
| 5,059,398 | A | 10/1991 | Kenney |
| 5,609,803 | A | 3/1997 | Addeo et al. |
| 6,399,188 | B1 | 6/2002 | Smith et al. |
| 7,785,466 | B1 | 8/2010 | Smith |
| 2015/0030512 | A1 | 1/2015 | Kim et al. |
| 2018/0280966 | A1 | 10/2018 | Cadotte et al. |
| 2020/0164564 | A1* | 5/2020 | Cadotte, Jr. .............. B29C 49/04 |
| 2020/0330975 | A1* | 10/2020 | Cadotte, Jr. .............. B29C 49/04 |
| 2021/0001325 | A1* | 1/2021 | Cadotte, Jr. .............. B29C 49/06 |

FOREIGN PATENT DOCUMENTS

| | | |
|---|---|---|
| CN | 102316988 A | 1/2012 |
| CN | 202584947 U | 12/2012 |
| CN | 104302401 A | 1/2015 |
| CN | 105051515 A | 11/2015 |
| EP | 2029666 A2 | 3/2009 |
| GB | 1330610 A | 9/1973 |
| JP | 63-135225 A | 6/1988 |
| WO | 2007/149893 A2 | 12/2007 |
| WO | 2017/091540 A1 | 6/2017 |

OTHER PUBLICATIONS

Chinese Patent Application No. 201880088096.8, Office Action dated Jul. 1, 2021, 12 pages (6 pages of English Translation and 6 pages of Original Document), Chinese Patent Office.

\* cited by examiner

PIPETTE WITH ENCAPSULATED OR INTEGRAL FILTER, AND METHOD AND APPARATUS FOR FORMING SAME

CROSS-REFERENCE TO RELATED APPLICATION

This is a national stage application under 35 U.S.C. § 371 of International Application No. PCT/US2018/062901, filed on Nov. 28, 2018, which claims the benefit of priority under 35 U.S.C § 120 of U.S. Provisional Application Ser. No. 62/592,914 filed on Nov. 30, 2017, the content contents of which are relied upon and incorporated herein by reference in their entirety.

FIELD

The present disclosure relates generally to unitary measuring pipettes incorporating improved filters, as well as methods and apparatuses for forming the same.

BACKGROUND

Pipettes are well-known tubular devices that usually have openings at both ends, and are designed to dispense measured quantities of liquids. Pipettes have had widespread usage in a number of industries where accurate measurement and delivery of fluids are required, particularly the medical and laboratory testing and analysis fields. Measuring pipettes typically embody straight glass or plastic tubes with one tapered end, and are calibrated into small divisions so that various amounts of liquid can be measured with the same pipette. Measuring pipettes include Mohr pipettes (with graduation marks that end before tapering begins proximate to the tip) and serological pipettes (with graduation marks that continue to a tapering region proximate to the tip).

Multiple different methods exist for fabricating pipettes, including (i) welding mouthpiece and tip components to a hollow tube, (ii) reheating a thick tube followed by drawing down and trimming the pipette at one or both ends to form a tip and mouthpiece, and (iii) molding with application of a pressure differential, including vacuum forming and blow molding. Each of these methods entails certain tradeoffs with respect to cost, quality, and/or performance.

Examples of molding with application of a pressure differential according to method (iii) to form pipettes are disclosed in International Publication No. WO 2017/091540 A1 entitled "Unitary Serological Pipette and Methods of Producing the Same," which is assigned to Corning Incorporated and is hereby incorporated by reference herein. An exemplary pipette 10 that may be produced according to such a method is shown in FIG. 1A, with the pipette 10 including a mouth region 12, a body region 14, and a tip region 16, with magnified portions of the foregoing regions shown in FIGS. 1B-1D, respectively. (FIGS. 1A-1D correspond to figures contained in International Publication No. WO 2017/091540 A1.) Each of the mouth region 12, the body region 14, and the tip region 16 may have a corresponding wall thickness (namely, a mouth thickness 22, a body thickness 24, and a tip thickness 26) and a corresponding diameter (namely, a mouth diameter 32, a body diameter 34, and a tip diameter 36). FIGS. 1B-1D also show the pipette 10 as having an inner curved surface 11 that encloses a space 18. Referring to FIG. 1A, the pipette 10 includes a mouth 13 and a tip 15 that are aligned along a longitudinal axis, and includes a filter 19 proximate to the mouth 13. Optionally, the pipette 10 may have a mouth-body transition region 20 between the mouth region 12 and the body region 14, as well as a body-tip transition region 21 between the body region 14 and the tip region 16. In certain implementations, a substantially smooth inside surface 31 is provided in the transition regions 20, 21 to reduce retention of fluid and/or particulate material. The pipette 10 may also include a series of graduated volumetric markings 17 printed (or imprinted) along an outside surface 30 of (at least) the body region 14 to indicate a volume of liquid contained in the space 18 within the pipette 10. The pipette 10 may be sized to hold a particular volume of liquid (e.g., 1 mL, 2 mL, 5 mL, 10 mL, 25 mL, 50 mL, 100 mL, or another desired volume). The pipette 10 may be manufactured of any suitable materials, such as glass or polymers (e.g., polystyrene, polyethylene, or polypropylene).

Optionally, the mouth thickness 22, the tip thickness 26, or both the mouth thickness 22 and the tip thickness 26, may be similar to the body thickness 24. In certain implementations, one, some, or all of the mouth thickness 22, the tip thickness 26, and the body thickness 24 may be in a range of from 0.25 mm to 2.5 mm, or from 0.4 mm to 1.5 mm, or from 0.6 mm to 1.0 mm, or from 0.25 mm to about 0.5 mm, or from about 0.25 mm to about 0.5 mm. Enhanced thickness in the mouth and tip regions 12, 16 may provide certain advantages, such as by making such regions more resistant to damage or breakage during use. The mouth, body, and tip diameters 32, 34, 36 may each be measured externally (e.g., between opposing points on an outer surface of the pipette 10). Optionally, the body diameter 34 may be greater than either the mouth diameter 32 or the tip diameter 36. The specific body diameter 34 may depend on the volume of liquid the pipette 10 is sized to hold. In certain instances, the body diameter may be in a range of from about 4.0 mm to about 25.0 mm.

Fabrication of the pipette 10 by molding with application of a pressure differential may include supplying a heated parison (e.g., a tube or preform, typically in the shape of a hollow cylinder) into a mold, and creating a differential pressure between an interior and an exterior of the parison to cause the parison to expand and conform to a cavity of the mold. Optionally the heated parison may be extruded directly into the mold. Differential pressure between across a wall of a parison may be created by either supplying pressurized gas (e.g., compressed air at 0.05 to 1.5 MPa) into an interior of the parison, or by generating subatmospheric pressure conditions (also known as vacuum conditions, e.g., at a pressure of 0.01 to 0.09 MPa) along surfaces defining the cavity of the mold. When the expanded material (now embodied in a pipette) has cooled sufficiently, the mold is opened, the pipette is ejected, and the mold may receive another heated parison (e.g., by extrusion into the mold) to repeat the process. Thereafter, in a secondary post-fabrication step, the filter 19 is inserted into the mouth 13 of the pipette 10 to be retained within the mouth region 12. The filter 19 typically comprises a fibrous material.

The process of adding a fibrous filter to a pipette requires precision filter cutting, conveying, and insertion equipment. Filter insertion equipment (also known as filter plugging equipment) may include one or more stations to accomplish functions of inserting a filter into a pipette mouthpiece, and tamping the filter to a desired position within the mouthpiece. Yet another station may check for presence and proper positioning of a filter in a pipette mouthpiece before clearing the pipette for further processing operations (e.g., sterilization and packaging). In certain instances, a pipette may need to be designed with a molded mouthpiece component to provide a locating feature to register the depth of the filter in the pipette. A grain size of the filter must also be optimized with the inner diameter of a pipette mouthpiece to enable an interference fit between the filter and mouthpiece, and thereby prevent the filter from moving. A failure to properly position and retain a filter within a pipette may lead to detrimental effects such as: presence of loose fibers or particles in a pipette; incursion of additional labor cost to reprocess a pipette during manufacturing; and/or interference with pipette operation, thereby rendering the pipette to be unusable by the end user.

Given the foregoing, there is a need for pipettes having improved filters, as well as a need for improved methods and apparatuses for producing such pipettes.

SUMMARY

Measuring pipettes (e.g., serological pipettes) including filters, as well as methods and apparatuses for forming measuring pipettes including filters, are provided herein.

Methods and apparatuses herein permit a filter material or a filter material precursor to be introduced into a hollow interior of a softened thermoplastic material present within a mold during pipette fabrication. A pipette produced by such a method may include a filter element comprising foamed polymeric material within a mouthpiece region, wherein an outer portion of the filter element is bound to or encapsulated in an inner wall of the mouthpiece region. Compared to pipettes with conventional press-fit fibrous filters, a pipette as disclosed herein may exhibit enhanced filter reliability and performance, reduced contamination attributable to fibers or particulates, and reduced fabrication cost.

In accordance with certain aspects of the present disclosure, a pipette comprises a tubular body arranged between a tip region and a mouthpiece region, and having a longitudinal axis extending between the tip and the mouthpiece, and a filter element comprising a foamed polymeric material within the mouthpiece region, wherein an outer portion of the filter element is bound to or encapsulated in an inner wall of the mouthpiece region.

In accordance with additional aspects of the present disclosure, a method for fabricating a pipette is provided. The method comprises supplying a heated thermoplastic material forming a tubular wall into a mold cavity, wherein the tubular wall bounds a hollow interior. The method further comprises supplying a filter material or a filter material precursor into at least a portion of the hollow interior while the thermoplastic material is at an elevated temperature within the mold cavity. The method further comprises allowing the thermoplastic material to cool and solidify to form a pipette comprising a tubular body arranged between a tip region and a mouthpiece region, with a filter element corresponding to the filter material or the filter material precursor being bound to or encapsulated in an inner wall of the mouthpiece region.

In accordance with additional aspects of the present disclosure, an apparatus for fabricating a pipette having a filter is provided. The apparatus comprises an extrusion die configured to generate flowable thermoplastic material forming a thermoplastic tube having a tubular wall bounding a hollow interior. The apparatus further comprises a mold defining a mold cavity configured to receive the thermoplastic tube. The apparatus further comprises a material ejector configured to supply a filter material or a filter material precursor into at least a portion of the hollow interior while the thermoplastic tube is within the mold cavity.

Additional features and advantages of the subject matter of the present disclosure will be set forth in the detailed description which follows, and in part will be readily apparent to those skilled in the art from that description or recognized by practicing the subject matter of the present disclosure as described herein, including the detailed description which follows, the claims, as well as the appended drawings.

It is to be understood that both the foregoing general description and the following detailed description present embodiments of the subject matter of the present disclosure, and are intended to provide an overview or framework for understanding the nature and character of the subject matter of the present disclosure as it is claimed. The accompanying drawings are included to provide a further understanding of the subject matter of the present disclosure, and are incorporated into and constitute a part of this specification. The drawings illustrate various embodiments of the subject matter of the present disclosure and together with the description serve to explain the principles and operations of the subject matter of the present disclosure.

BRIEF DESCRIPTION OF THE DRAWINGS

The following is a description of the figures in the accompanying drawings. The figures are not necessarily to scale, and certain features and certain views may be show exaggerated in scale or in schematic, in the interest of clarity or conciseness.

DETAILED DESCRIPTION

The present disclosure relates to measuring pipettes (e.g., serological pipettes) that include integral or encapsulated filters, as well as methods and apparatuses for forming measuring pipettes including such filters. A filter material or a filter material precursor may be introduced into a hollow interior of a softened thermoplastic material present within a mold during pipette fabrication (e.g., using blow molding or vacuum forming techniques) to form a filter element. Such a filter element may comprise foamed polymeric material within a mouthpiece region, wherein an outer portion of the filter element is bound to or encapsulated in an inner wall of the mouthpiece region. A solid structure embodying foamed polymeric material is free of loose fibers and associated particulate that may result from fibrous filter elements press-fitted into conventional pipettes. In situ formation of filter elements during pipette fabrication eliminates the need for downstream handling and filter insertion equipment to effectuate filter insertion. Less post-forming handling entails reduced risk of damage to pipettes, reduced risk of contamination, and reduced manufacturing cost. Encapsulation of filter material in the body material of a pipette also eliminates the potential for filter movement during pipette manufacturing, shipping, or use. Foamed materials may also exhibit better aerosol blocking attributes than conventional fibrous filter materials, thereby providing enhanced filtration performance. Moreover, the need for locating features to register the depth of a filter in a pipette may be avoided, and the need to enhance wall thickness of a mouthpiece region to provide a narrow inner diameter to create an interference fit with filter material may be eliminated.

Blow molding or vacuum forming of pipettes with thermoplastic material may result in a body structure of biaxially oriented polymer, thereby enabling wall thickness of a pipette body to be reduced. Polymer chains are oriented by subjecting them to extensional strain (flow) in a melted or near-melted state. Biaxial orientation of a polymer material can be achieved by straining the material in two directions (e.g., a radial direction and a lengthwise direction) at elevated temperature, and allowing the material to cool while strained. As compared to unoriented or uniaxially oriented polymers, biaxial orientation allows the production of reduced thickness films and containers having enhanced mechanical and optical properties. Biaxial orientation may be obtained from blow-molding or vacuum molding operations.

Before turning to specific details of apparatuses and methods for in situ formation of filter elements during pipette fabrication, a general introduction to apparatuses and method steps for forming measuring pipettes by molding with application of a pressure differential is provided below, with reference to FIGS. 3A to 5.

Figure 1A:
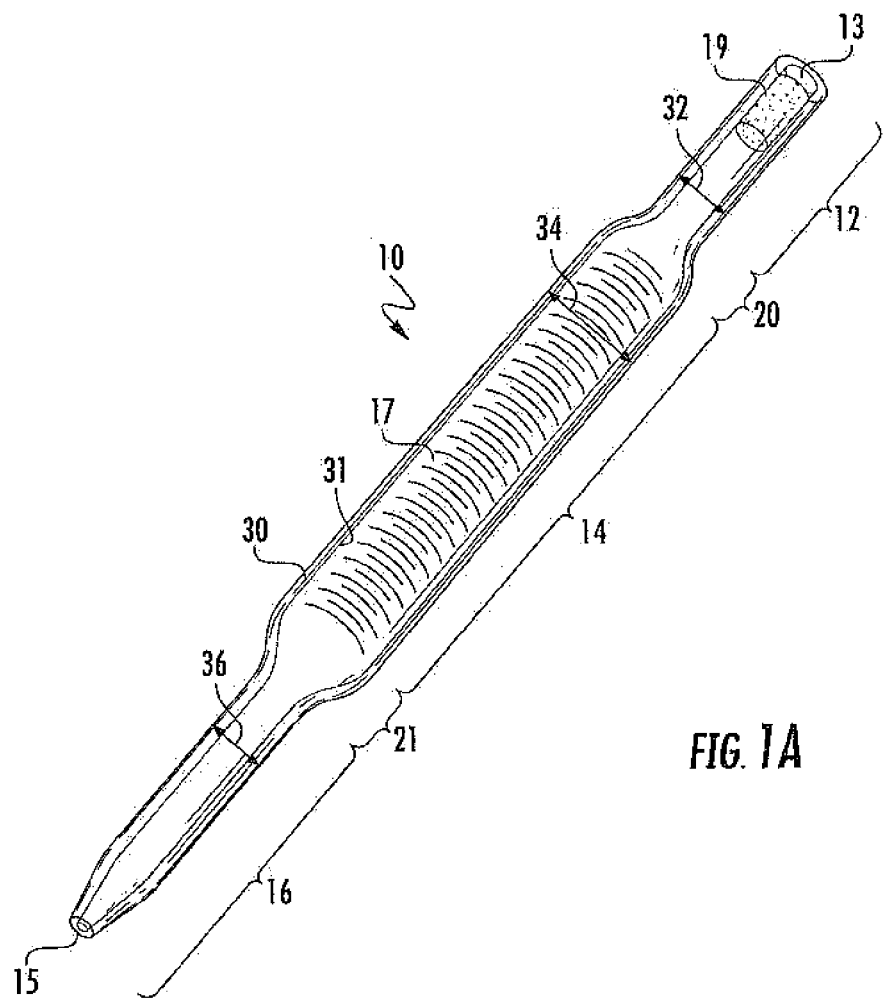
FIG. 1A is a perspective view illustration of a unitary measuring pipette with graduation marks.
Figure 1B:
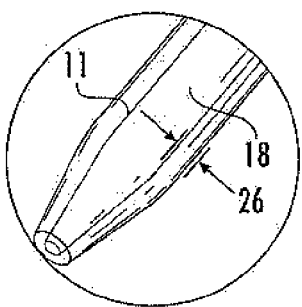
FIGS. 1B-1D provide magnified perspective views of a mouth region, a body region, and a tip region, respectively, of the pipette of FIG. 1A.
Figure 1C:
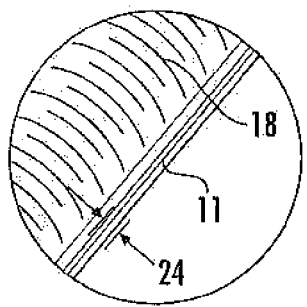
Figure 1D:
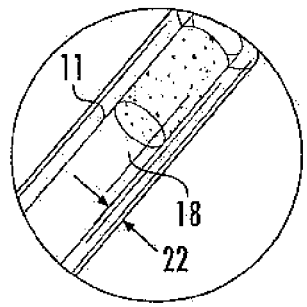
Figure 2A:
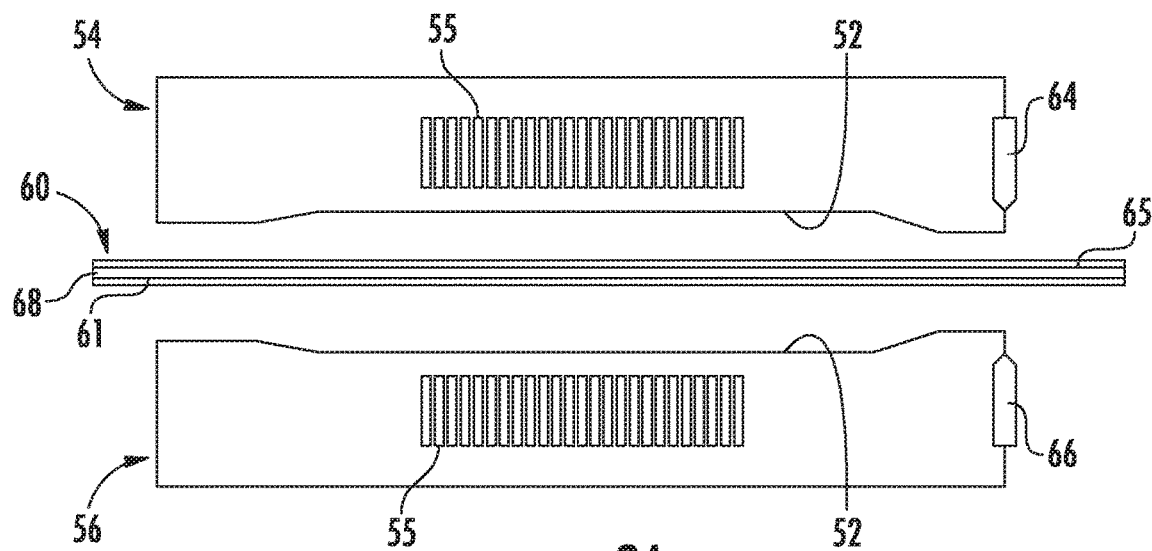
FIGS. 2A-2C are schematic cross-sectional view illustrations of steps of a method for vacuum forming a unitary measuring pipette.
Figure 2B:
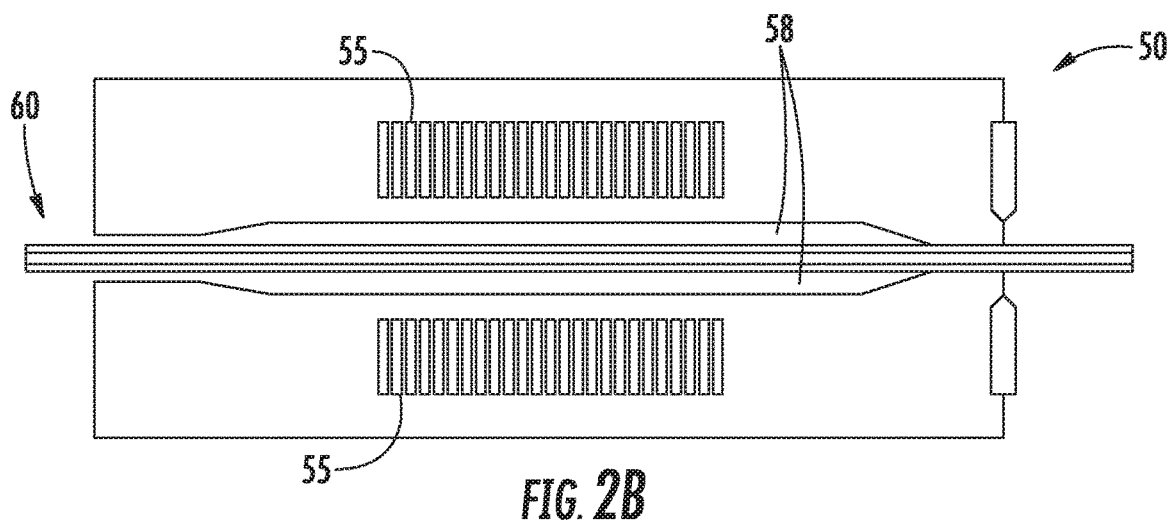
Figure 2C:
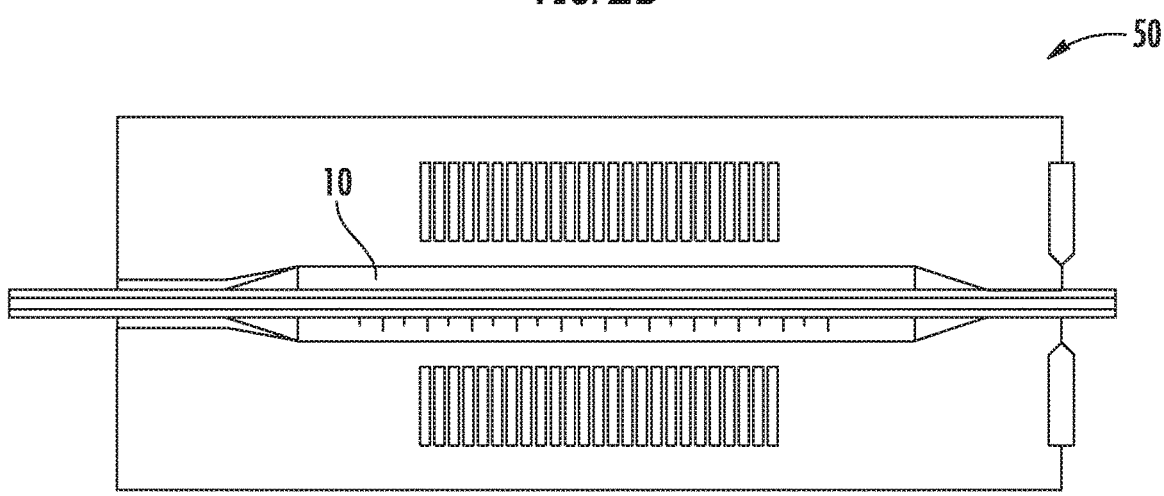

FIGS. 2A-2C are schematic cross-sectional view illustrations of steps of a method for forming a unitary measuring pipette by molding with application of a pressure differential (e.g., blow molding or vacuum forming). A parison 60 (or a tube or preform) may be inserted into a mold 50, which is composed of mold halves 54, 56 defining a mold cavity 58 bounded by molding surfaces 52. The mold 50 may include mold end features 64, 66, which may include blades, knives, or sharp edges used to cut or score a parison 60 or pipette 10 (as shown in FIG. 1A) formed in the mold 50. Typically, the parison 60 is in the shape of a hollow cylinder; however, the parison 60 could optionally be provided as a hollow hexagonally-walled prism, or another shape. The parison 60 may comprise an inner curved surface 61 that encloses an interior space 68. The parison 60 may be manufactured from any suitable material (including polymers such as polystyrene and polypropylene, or glass), for example, by extruding a polymer melt to form a hollow cylindrical tube. The parison 60 may be heated to within a softening temperature at which the material of the parison 60 is readily formable, followed by either (i) insertion of the parison 60 into the mold cavity 58, or (ii) closure of the mold halves 54, 56 around the parison 60. Then a pressure differential is created between the interior of the parison 60 and the mold cavity 58, such as by introducing pressurized gas into the parison, or by establishing subatmospheric (e.g., vacuum) pressure conditions in the mold cavity 58. If blow molding is used, then compressed air (for example, 0.05 to 1.5 MPa) may be introduced into the interior space 68 of the parison 60, and any air in the mold cavity 58 may escape through gas passages 55. Conversely, if vacuum forming is used, then a subatmospheric pressure condition (in a range, for example, of about 0.01 MPa to about 0.09 MPa) may be created by evacuating the mold 50 through vacuum passages 55. The reduced pressure in the mold cavity 58 causes the parison 60 to expand outward to contact the mold 50 (which is at a lower temperature) and conform to the shape of the mold cavity 58 to form a pipette 10.

Fabricating a pipette 10 (as shown in FIG. 1A) by vacuum forming may enhance the toughness of the pipette 10 due to biaxial expansion during the vacuum forming process. During vacuum forming, surface features such as volumetric markings 17 (as shown in FIG. 1A) may be added to an outer surface of the pipette 10. These volumetric markings 17 may be created by several different techniques, either alone or in combination with each other. These techniques may include: printing or imprinting the mold cavity 58 to create mold surface features that correspond to pipette surface features during molding; depositing ink on the surface of the mold cavity 58 that is then transferred to an outer surface of the pipette 10 during molding; or inserting a label into the mold cavity 58 that attaches to an outer surface of the pipette 10 during molding. Once the pipette 10 has cooled sufficiently, the mold 50 may be opened, for example by opening the mold halves 54, 56, and the pipette 10 may be ejected. Optionally, one or both mold halves 54, 56 may be pivoted to accomplish opening of the mold 50. A new parison may then be inserted into the mold 50, and the process may be repeated to form another pipette.

Figure 3:
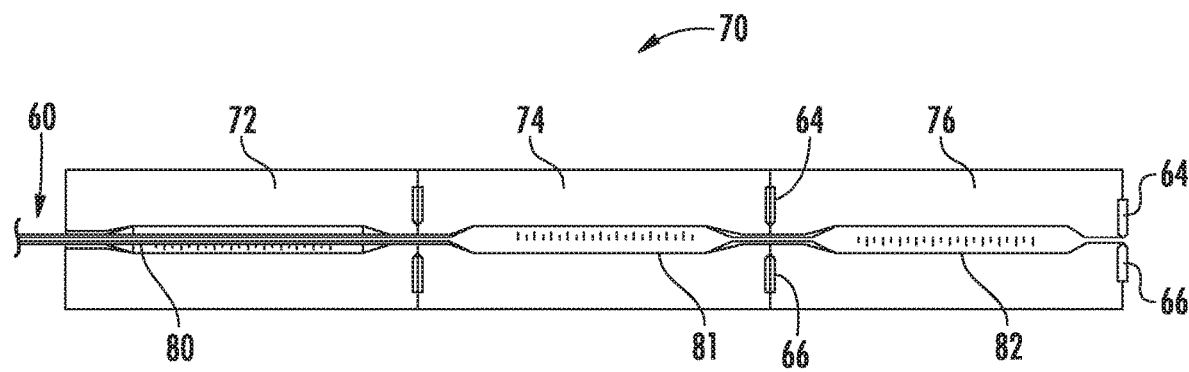
FIG. 3 is a schematic cross-sectional view illustration of an apparatus for molding three unitary measuring pipettes, with separation features between pipette cavities.

In certain implementations, a mold may be used to fabricate multiple pipettes simultaneously. FIG. 3 illustrates a mold 70 comprising three mold sections 72, 74, 76 in which three pipettes 80-82 have been formed. The pipettes 80-82 may be vacuum formed and separated in accordance with separation features as described in further detail below. As one example, the pipettes 80-82 may be cut by separation features 64, 66, which may be blades, knives, or sharp edges used to cut or score a parison 60 or pipette 80-82. Optionally, pipettes 80, 81 may be arranged such that their tip regions are adjacent to each other, and pipettes 81, 82 may be arranged such that their mouth regions are adjacent to each other. Arranging the pipettes tip-to-tip and mouth-to-mouth may enhance production efficiency and reduce production costs. For example, the amount of scrap pipette material generated may be reduced by arranging adjacent pipettes tip-to-tip and mouth-to-mouth. As an alternative, pipettes may be arranged such that the mouth region of a first of pipettes 80, 81 is adjacent to the tip region of the other of pipettes 81, 82. The large step change from the mouth thickness to the tip thickness provides a position in the mold 70 where force on the pipettes 81, 82 facilitates separation, and may lead to enhanced separation efficiency. Although not shown in FIG. 3, it is to be appreciated that vacuum passages may be defined through the mold sections 72, 74, 76 to enable vacuum forming to be performed.

Figure 4:
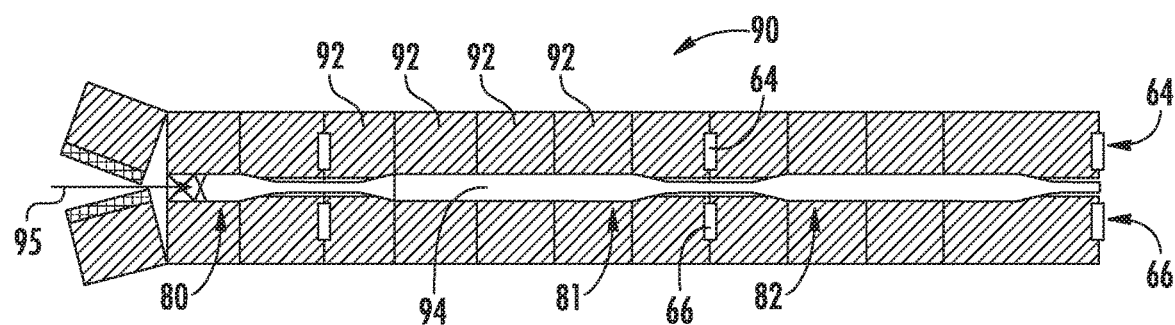
FIG. 4 is a schematic cross-sectional view illustration of an apparatus for molding three unitary measuring pipettes including a plurality of successively separable mold assembly segments.

In certain implementations, a mold assembly may include multiple mold assembly segments that may be sequentially arranged to form one or more pipettes. Optionally, each mold assembly segment may be shorter than a full length of an individual pipette. FIG. 4 illustrates a mold assembly 90 comprising a plurality of mold assembly segments 92 that may be selectively opened and closed as desired during pipette fabrication. As an alternative to preforming a parison and inserting the parison into the mold, a polymer melt may be extruded from extruder output 95 to form a parison or preform while contacting the parison or preform with the mold assembly segments 92 in succession. The mold assembly 90 is shaped to form the pipettes 80-82, which conform to internal cavities 94 of the mold assembly segments 92. In certain implementations, individual mold assembly segments 92 may have lengths ranging from about 0.25 inch to about 14 inches, or from about 0.50 inch to about 10 inches, or from about 1.0 inch to about 7.0 inches, or from about 2.0 inches to about 4.0 inches. Compressed air may be applied intermittently or continuously into the mold assembly 90 to form pipettes 80-82 in the shape of the mold assembly 90. Subatmospheric pressure may be intermittently or continuously introduced in the mold assembly 90 (outside the pipettes 80-82) via gas passages (not shown) defined in the mold assembly segments 92 and in fluid communication with molding surfaces bounding the cavities 94 of the mold assembly segments 92. When subatmospheric pressure conditions are continuously maintained, the mouth, body, and tip portions of the pipettes 80-82 may be formed by varying a speed in which the mold assembly segments 92 are contacted with the pipettes 80-82 and/or by varying an output speed of the extruder output 95. The pipettes 80-82 may be drawn and cut by separation features 64, 66, which may include blades, knives, or sharp edges used to cut or score the pipettes 80-82.

In certain embodiments, filter elements bound to or encapsulated in a mouthpiece region of a pipette may comprise foamed polymeric material. In certain embodiments, a foamed polymeric material may comprise a thermoset foam material. A thermoset is a plastic that is irreversibly cured from a soft solid or viscous liquid prepolymer or resin. In certain embodiments, a foamed polymeric material may comprise a crosslinking foam material.

In certain embodiments, foamed polymeric material used as a filter element includes significant open cell content. Foam having an open cell content of about 20% or more, preferably about 50% or more, more preferably about 60% or more, and most preferably about 70% or more, is considered open-cell foam.

One method of producing open cell thermoplastic foams is by foaming at elevated temperatures. Another method of producing open cell thermoplastic foam is to employ dissimilar, nonmiscible polymers into the resin, wherein the dissimilar, nonmiscible polymers help to open cells by forming domains in the walls of expanding cells.

In certain embodiments, a foamed polymeric material includes a foamable thermoplastic composition and a blowing agent. Common blowing agents that may be used with nonmiscible polymers include physical blowing agents, which are generally added under pressure and dissolved into the resin prior to expansion, or chemical blowing agents which decompose during processing to generate the blowing agent gases, such as carbon dioxide and/or nitrogen. Examples of blowing agents that may be used in certain embodiments include HCFCs (hydrochlorofluorocarbons) (e.g., HCFC-142b (1-chloro-1,1-difluoroethane) and HCFC-22 (chloro-difluoromethane)), HFC's (hydrofluorocarbons) (e.g., HFC-134a (1,1,1,2-tetrafluoroethane), HFC-152a (1,1-difluoroethane), HFC-32 (difluoromethane), HFC-143a (1,1,1-trifluoroethane), and HFC-125 (pentafluoroethane)), alkanes (including n-pentane, iso-pentane, cyclopentane, n-butane, iso-butane, and hexane), carbon dioxide, nitrogen, and mixtures thereof.

Various additives may be incorporated into a foamed polymeric material useable as a filter element. In certain embodiments, trans-1,2-dichloroethylene (TDCE) can be used to help control the open cell content of a thermoplastic foam, particularly polystyrene foam, as disclosed in European Patent Publication No. EP20296666 A2. Adding a small amount of TDCE to a foamable thermoplastic composition being blown with a low solubility blowing agent can improve processability by decreasing the required operating pressure and limiting premature degassing. In certain embodiments, blowing agent compositions may contain less than about 20 wt % TDCE, or less than about 10 wt % TDCE. Because TDCE is a good solvent for polystyrene, too high a level of TDCE in the blowing agent blend might make it difficult to produce low density, closed-cell foam of polystyrene. Since addition of TDCE can improve the solubility of a blowing agent in a resin mix, the presence of TDCE may allow production of lower density closed cell foam than would be obtained if a blowing agent were used without TDCE.

Foamed materials may be characterized in part by cell size. In certain embodiments, a polymeric foam material may have an average cell size of 1 millimeter or less, preferably, an average cell size of 0.1 millimeter or less, and more preferably 0.01 to 1.0 millimeters (10 to 1000 micrometers) according to ASTM D3576-77. In certain embodiments, a polymeric foam may have an average cell size of 0.01 to 0.07 millimeters.

In certain embodiments, a foam may have a mean flow pore diameter (MFPD) of from 0.1 to 50 micrometers, optionally modified by lower bound values of 1, 5, 10, or 15 micrometers. Desired MFPD values will vary depending on the medium to be filtered (e.g., gas, liquid, or both), the contaminants or constituents to be removed by filtration, available pressure differential, and desired efficiency levels. In contrast to average cell size (which relates to average cell dimension in the foam), MFPD relates to the mean pore size at which one half of total medium flow (e.g., air flow) occurs through pores greater in size than the mean pore size, and one half of total medium flow occurs through pores smaller in size than the mean pore size.

Various types of polymeric materials (e.g., plastics) may be produced as foams suitable for forming filter elements as disclosed herein. In certain embodiments, a foamed polymeric material may comprise at least one material selected from the group consisting of polyethylenes, polystyrenes, metallocene catalyst polyethylenes, polybutanes, polybutylenes, polyurethanes, silicones, vinyl-based resins, thermoplastic elastomers, polyesters, ethylenic acrylic copolymers, ethylene-vinyl-acetate copolymers, ethylene-methyl-acrylate copolymers, ethylene-butyl-acrylate copolymers, ethylene-ethyl-acrylic copolymers, ionomers, polypropylenes, and copolymers of polypropylene and copolymerizable ethylenically unsaturated comonomers, as well as ethylenic acrylic copolymers, ethylene-vinyl-acetate copolymers, ethylene-methyl-acrylate copolymers, thermoplastic polyurethanes, thermoplastic olefins, thermoplastic vulcanizates, flexible polyolefins, fluoroelastomers, fluoropolymers, and blends thereof, ethylene-butyl-acrylate copolymers, and ethylene-ethyl-acrylic copolymers.

Figure 5A:
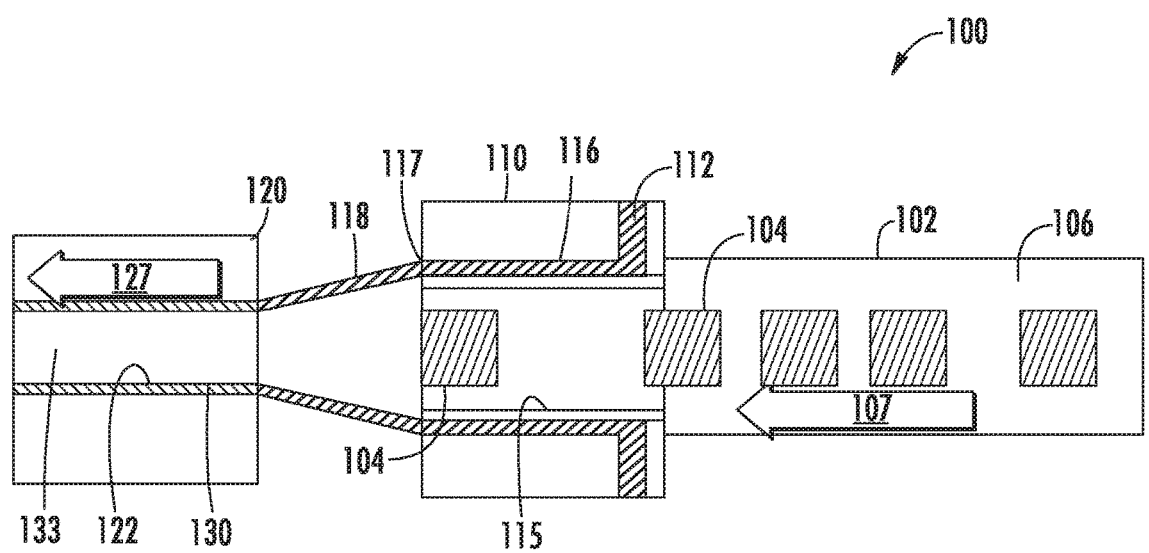
FIG. 5A is a schematic cross-sectional view illustration of an upstream portion of a pipette fabrication apparatus including a material ejector configured to supply preformed, discrete cylindrical blocks of filter material in solid form into a flowing stream of extruded thermoplastic material being supplied to a mold.

FIG. 5A is a schematic cross-sectional view illustration of an upstream portion of a pipette fabrication apparatus 100 including a material ejector 102 configured to supply preformed, discrete cylindrical blocks of filter material 104 in solid form into a flowing tubular stream 118 of extruded thermoplastic material 112 being supplied from an extruder 110 to a mold 120. The blocks of filter material 104 may comprise foamed polymeric material. The material ejector 102, the extruder 110, and the mold 120 are collinearly arranged, with a central passage 115 being defined in the extruder 110 to permit transit of the blocks of filter material 104. The material ejector 102 includes a track 106 to guide motion of the blocks of filter material 104 toward the extruder 110, with the filter material insertion direction being indicated by arrow 107. The extruder 110 includes internal passages 116 for conveying molten thermoplastic material 112 to an outlet 117 that is annular in shape. From the outlet 117, a tubular stream 118 of extruded thermoplastic material is supplied to a cavity 122 of a mold 120, where a hollow interior 133 is maintained in the thermoplastic material. When a block of filter material 104 contacts the tubular stream 118 of extruded thermoplastic material, the block of filter material 104 is carried to a portion of the hollow interior 133 within the cavity 122 of the mold 120. Release of the filter material 104 into the tubular stream 118 of extruded thermoplastic material may be timed to coincide with a melt region that will be formed into a pipette mouthpiece region. The mold 120 may include multiple mold assembly segments (e.g., such as mold assembly segments 92 illustrated and described in connection with FIG. 4) that may be sequentially arranged and selectively opened and closed as desired. A direction of transit of thermoplastic material relative to the mold 120 is indicated by arrow 127 in FIG. 5B. As the tubular stream 118 of extruded thermoplastic material cools and solidifies within the mold 120, it will shrink onto the block of filter material 104 and encapsulate it within a region (e.g., a mouthpiece region) of a resulting pipette 130, as shown in FIG. 5B.

Figure 5B:
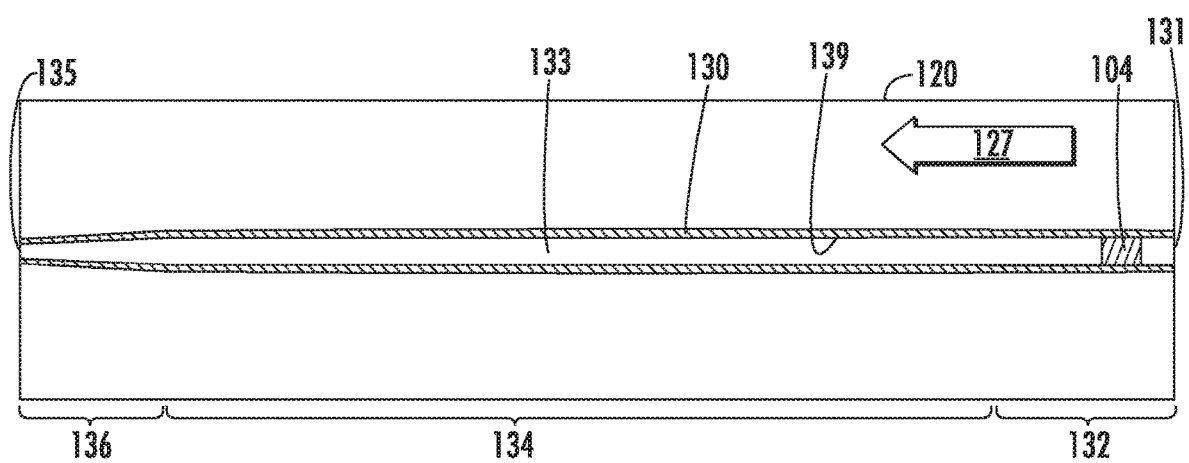
FIG. 5B is a schematic cross-sectional view illustration of a downstream portion of the mold of FIG. 5A having a pipette being formed therein, following reception within the interior of the pipette of an integral filter embodying a discrete cylindrical block of filter material.

FIG. 5B is a schematic cross-sectional view illustration of a downstream portion of the mold 120 of FIG. 5A having a pipette 130 being formed therein, following reception in the pipette interior 133 of an integral filter embodied in the discrete cylindrical block of filter material 104. The pipette 130 includes a mouthpiece region 132, a body region 134, and a tip region 136 all arranged between a tip 135 and a mouthpiece end 131. As shown, the filter material 104 is encapsulated in and against an inner surface 139 of the mouthpiece region 132.

Figure 6A:
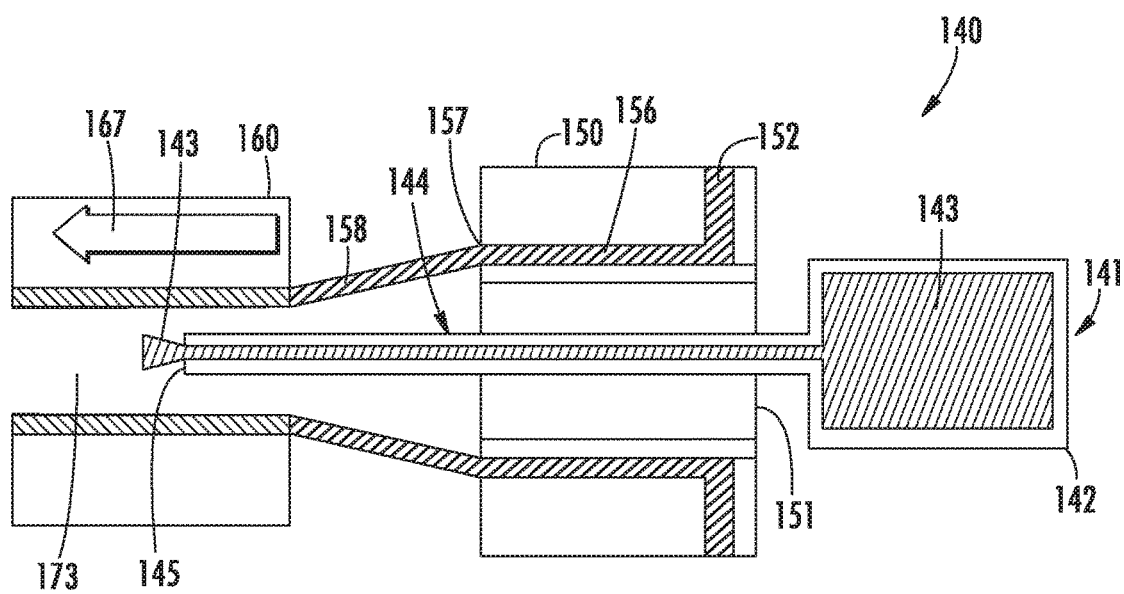
FIG. 6A is a schematic cross-sectional view illustration of a portion of a pipette fabrication apparatus including a material ejector configured to supply a flowable filter material precursor into a hollow interior of a heated thermoplastic material in a mold cavity, with the filter material precursor being supplied coaxially with heated thermoplastic material being supplied in tubular form to the mold cavity by an extruder.

FIG. 6A is a schematic cross-sectional view illustration of a portion of a pipette fabrication apparatus 140 including a material ejector 141 configured to supply a flowable (e.g., liquid-containing) filter material precursor 143 into a hollow interior of a flowing tubular stream 158 of extruded thermoplastic material 152 being supplied from an extruder 150 to a mold 160. The material ejector 141, the extruder 150, and the mold 160 are collinearly arranged, with a nozzle 144 passing through a core 151 of the extruder 150 and terminating at an outlet 145 within a cavity 162 (shown in FIG. 6B) of the mold 160. A flowable filter material precursor 143 may be stored in a reservoir 142 arranged upstream of the extruder 150. The extruder 150 includes internal passages 156 for conveying molten thermoplastic material 152 to an outlet 157 that is annular in shape. From the outlet 157, a tubular stream 158 of extruded thermoplastic material is supplied to the cavity 162 (shown in FIG. 6B) of the mold 160, where a hollow interior 173 is maintained in the thermoplastic material. Release of the flowable filter material precursor 143 into the hollow interior 173 may be timed to coincide with a portion of thermoplastic material that will be formed into a pipette mouthpiece region. An insertion direction of the flowable filter material precursor 143 is indicated by arrow 167. When the flowable filter material precursor 143 is released into the hollow interior 173, it will fill the hollow interior for a finite length, or the flowable filter material precursor 143 will expand into contact with an inner surface 179 of a mouthpiece region 172 (shown in FIG. 5B). In either instance, as the tubular stream 158 of extruded thermoplastic material cools and solidifies within the mold 160, it will shrink onto the filter 148 and encapsulate it within a region (e.g., a mouthpiece region) of a resulting pipette 130, as shown in FIG. 5B.

Figure 6B:
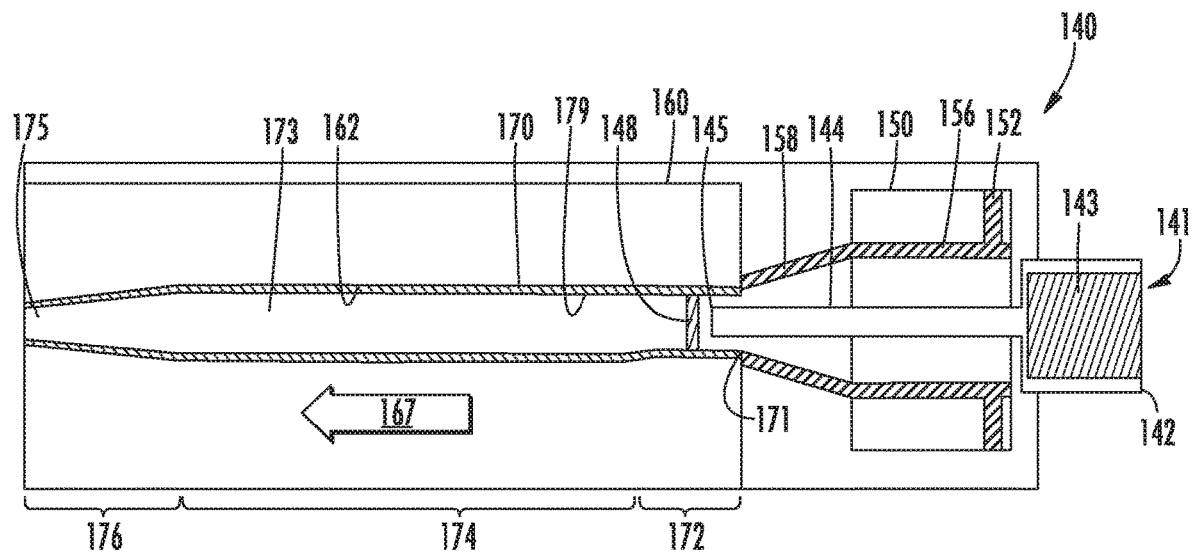
FIG. 6B is a schematic cross-sectional illustration of a larger portion of the pipette fabrication apparatus of FIG. 6A, following formation of a filter element from the filter material precursor in the interior of a mouthpiece region of a pipette arranged within the mold cavity.

FIG. 6B is a schematic cross-sectional view illustration of the pipette fabrication apparatus 140 of FIG. 6A having a pipette 170 being formed therein, following reception in the pipette interior 173 of an integral filter 148 formed from the flowable filter material precursor 143. Various elements previously described in connection with FIG. 6A will not be described again to promote brevity. The pipette 170 includes a mouthpiece region 172, a body region 174, and a tip region 176 all arranged between a tip 175 and a mouthpiece end 171, wherein the filter material 148 is encapsulated in and against an inner surface 179 of the mouthpiece region 172. Although not shown in FIGS. 6A and 6B, in certain embodiments, flowable filter material precursor 143 may be dispensed at a location just outside the mold 160.

Figure 7A:
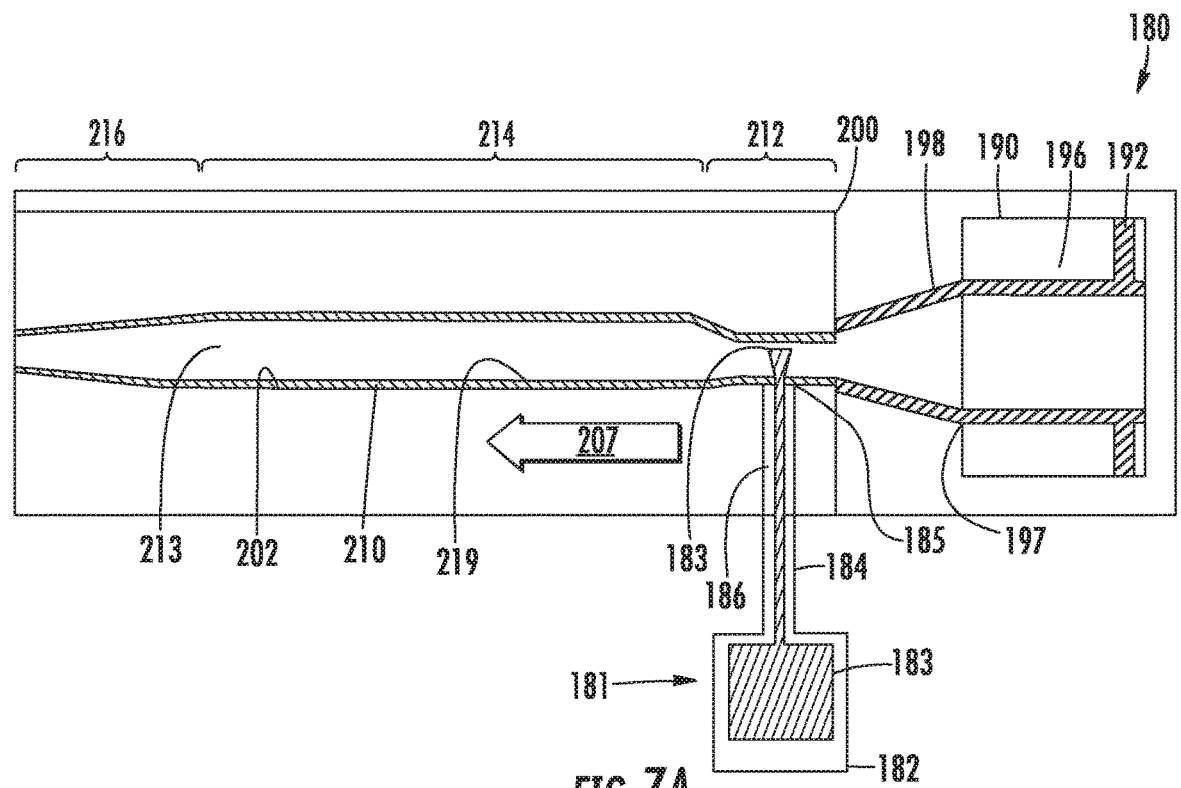
FIG. 7A is a schematic cross-sectional view illustration of a pipette fabrication apparatus including a material ejector configured to supply a flowable filter material precursor into a hollow interior of a heated thermoplastic material in a mold cavity, with the filter material precursor being supplied perpendicularly through a portion of a tubular wall formed by heated thermoplastic material being supplied in tubular form to the mold cavity by an extruder.

FIG. 7A is a schematic cross-sectional view illustration of a pipette fabrication apparatus 180 including a material ejector 181 configured to supply a flowable filter material precursor 183 into a hollow interior of a flowing tubular stream 198 of extruded thermoplastic material 192 being supplied from an extruder 190 to a mold 200. The extruder 190 and the mold 200 are collinearly arranged, but the material ejector 181 is positioned perpendicularly to the mold 200. A flowable filter material precursor 183 is stored in a reservoir 182, and may be supplied by a conduit 184 through a thermally- or mechanically-operated valve 186 to an outlet 185 that is defined in a surface of a cavity 202 of the mold 200. In this manner, flowable filter material precursor 183 may be dispensed through a wall of heated, softened thermoplastic material that will eventually form a pipette; after such dispensation is complete, the wall of heated, softened thermoplastic material preferably flows laterally to cover any temporary dispensation opening formed therein. The extruder 190 includes internal passages 196 for conveying molten thermoplastic material 192 to an outlet 197 that is annular in shape. From the outlet 197, a tubular stream 198 of extruded thermoplastic material is supplied to the cavity 202 of the mold 200 (e.g., parallel to the direction indicated by arrow 207), where a hollow interior 213 is maintained in the thermoplastic material. Release of the flowable filter material precursor 183 into the hollow interior 213 may be timed to coincide with a portion of thermoplastic material that will be formed into a pipette mouthpiece region. When the flowable filter material precursor 183 is released into the hollow interior 213, it may fill an inner diameter of the hollow interior 213. Alternatively, the flowable filter material precursor 183 may embody an expandable material, wherein enough flowable filter material precursor 183 is preferably dispensed to enable the flowable filter material precursor 183 to expand to fill an inner diameter of the hollow interior 213. In either instance, as the tubular stream 198 of extruded thermoplastic material 192 cools and solidifies within the mold 200, it will shrink onto the filter 188 and encapsulate it within a region (e.g., a mouthpiece region 212) of a resulting pipette 210, as shown in FIG. 7B.

Figure 7B:
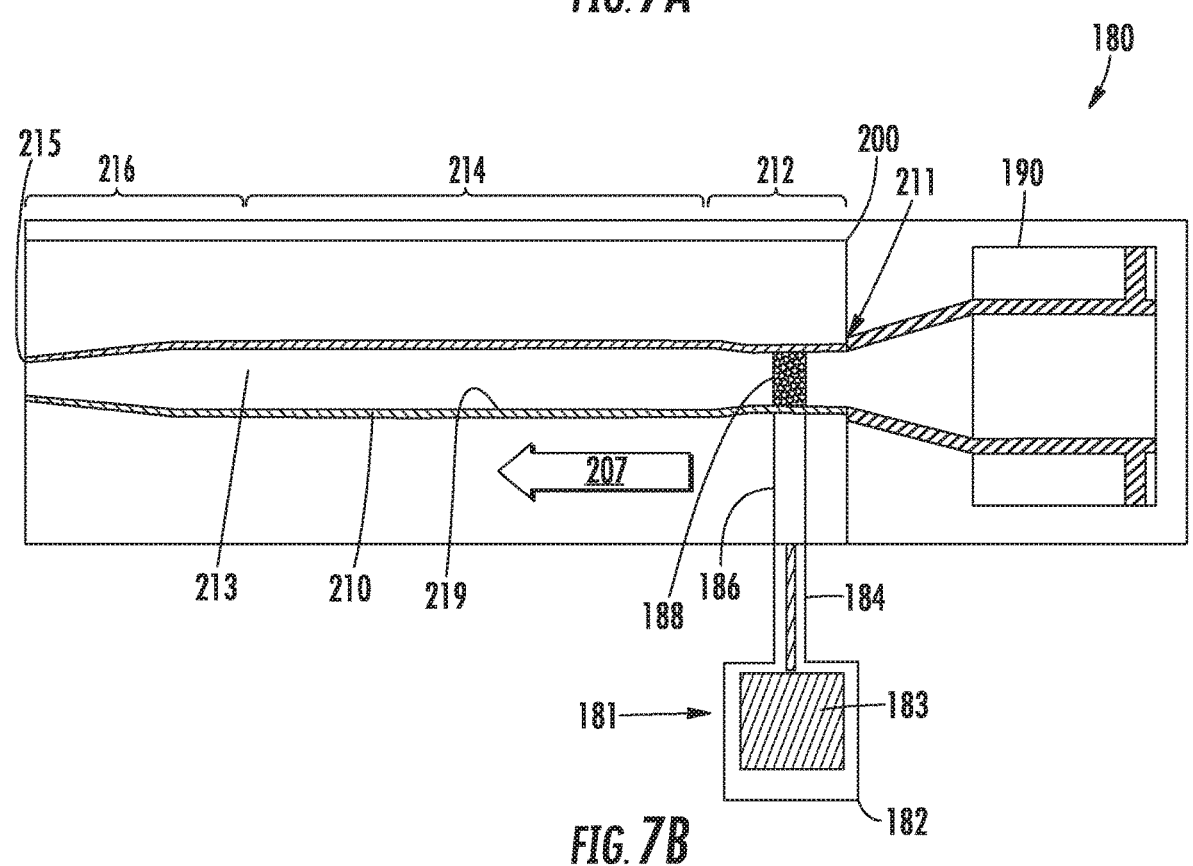
FIG. 7B is a schematic cross-sectional view illustration of the pipette fabrication apparatus of FIG. 7A, following formation of a filter element from the filter material precursor in the interior of a mouthpiece region of a pipette arranged within the mold cavity.

FIG. 7B is a schematic cross-sectional view illustration of the pipette fabrication apparatus 180 having a pipette 210 being formed therein, following reception in the pipette interior 213 of an integral filter 188 formed from the flowable filter material precursor 183. The pipette 210 includes a mouthpiece region 212, a body region 214, and a tip region 216, all arranged between a tip 215 and a mouthpiece end 211, wherein the filter material 188 is encapsulated in and against an inner surface 219 of the mouthpiece region 212.

In certain embodiments, a foaming agent may be injected into a melt stream for forming a pipette during formation of a mouthpiece region. During such a step, any vacuum or air pressure used to form a pressure differential for forming a mouthpiece is disabled (e.g., suspended or deferred). This action allows the melt stream to collapse and create a mass of porous material in the mouthpiece mold cavity, with such mass forming a porous filter. To allow for continuous deposition of material at the location of the filter, the extruder output may be increased and/or a line of mold assembly segments may be slowed. Once the required mass has been achieved, the desired pressure differential may be reestablished and regular production resumed. As the pipette body bearing the porous filter cools in its mold, the foamed material expands and solidifies to create a porous filter in the mouthpiece.

Figure 8A:
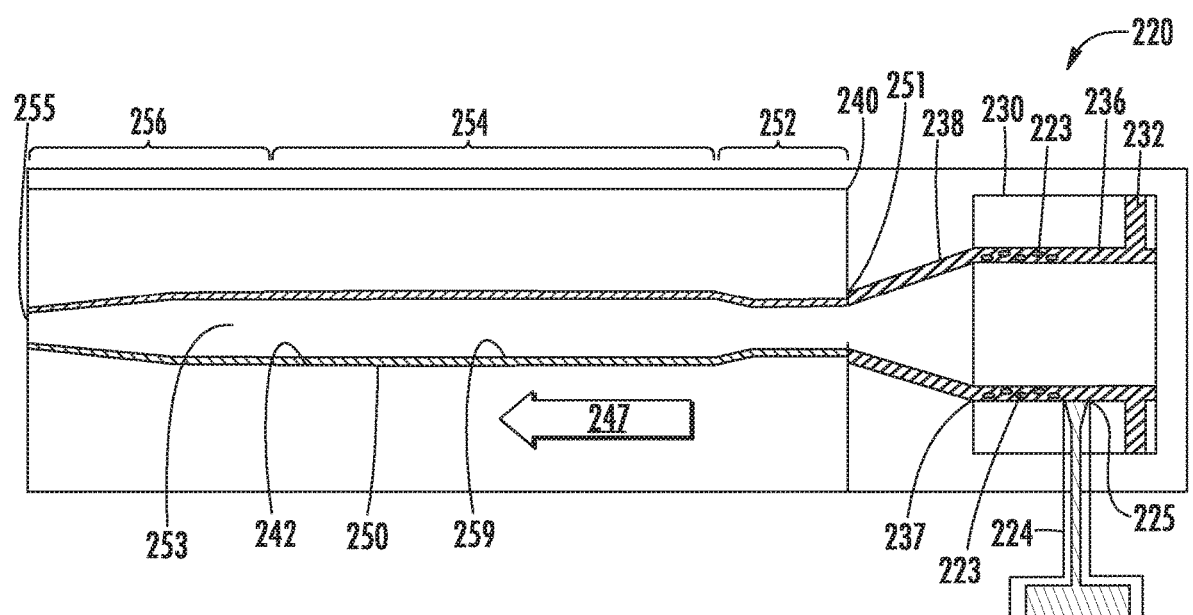
FIG. 8A is a schematic cross-sectional view illustration of a pipette fabrication apparatus including a material ejector injecting a flowable filter material precursor into a stream of molten thermoplastic material upstream of an extruder engaged in supplying thermoplastic material in tubular form to a mold cavity for forming a pipette.

FIG. 8A is a schematic cross-sectional view illustration of a pipette fabrication apparatus 220 including a material ejector 221 configured to inject a flowable filter material precursor 223 into an internal passage 236 of an extruder 230 to contact extruded thermoplastic material 232 upstream of an annular shaped extruder outlet 237. The apparatus 220 is suitable for fabricating a pipette 250 having a tubular body region 254 positioned between a tip region 256 and a mouthpiece region 252, all positioned between a tip 255 and a mouthpiece end 251. The pipette fabrication apparatus 220 is shown supplying a stream 238 of extruded thermoplastic material 232 from an extruder 230 to a mold 240. The extruder 230 and the mold 240 are collinearly arranged, but the material ejector 221 is positioned perpendicularly to the extruder 230. A flowable filter material precursor 223 is stored in a reservoir 222, and may be supplied by a conduit 224 and an outlet 225 (optionally including a valve, not shown) to the extruder 230. Within the extruder 230, flowable filter material precursor 223 may be injected into internal passages 236 upstream of the extruder outlet 237. From the outlet 237, a tubular stream 238 of extruded thermoplastic material, or a combination of extruded thermoplastic material and flowable filter material precursor 223, is supplied to the cavity 242 of the mold 240. Release of the flowable filter material precursor 243 into the extruder 230 may be timed to coincide with a portion of thermoplastic material that will be formed into a pipette mouthpiece region 252. An insertion direction of the stream 238 of extruded thermoplastic material 232 into the mold 240 is indicated by arrow 247.

Figure 8B:
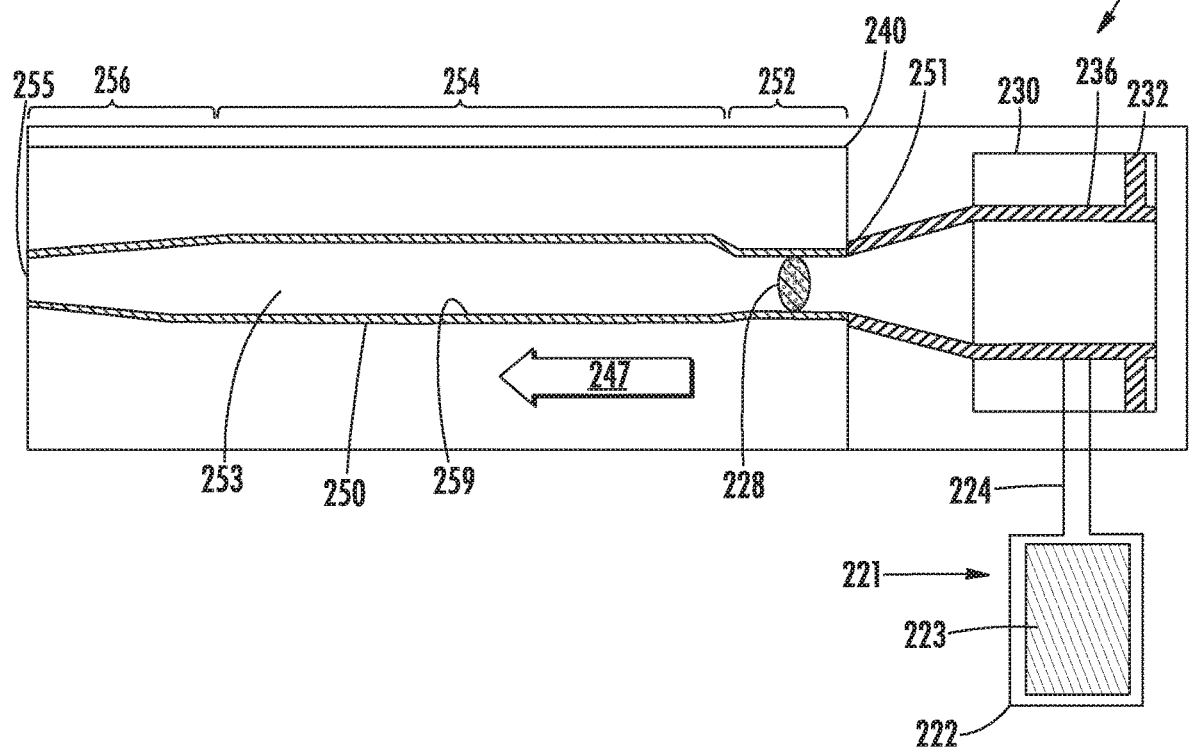
FIG. 8B is a schematic cross-sectional view illustration of the pipette fabrication apparatus of FIG. 8A, following formation of a filter element from the filter material precursor in the interior of a mouthpiece region of a pipette arranged within the mold cavity.

FIG. 8B is a schematic cross-sectional view illustration of the pipette fabrication apparatus 220 having a pipette 250 being formed therein, following reception in the pipette interior 253 of an integral filter element 228 formed from the flowable filter material precursor 223. Within the pipette 250, the integral filter element 228 is encapsulated in and against an inner surface 259 of the mouthpiece region 252 within an otherwise hollow interior 253 of the pipette 250. The integral filter element 228 may be formed as previously described, including injection of a flowable filter material precursor (e.g., a foamable thermoplastic composition and a blowing agent) into a melt stream for forming a pipette during formation of a mouthpiece region. During such a step, any vacuum or air pressure used to form a pressure differential for forming a mouthpiece is disabled (e.g., suspended or deferred), but later reestablished after a combined melt stream collapses and creates a mass of porous material in the mouthpiece mold cavity to yield the integral filter element 228.

Figure 9A:
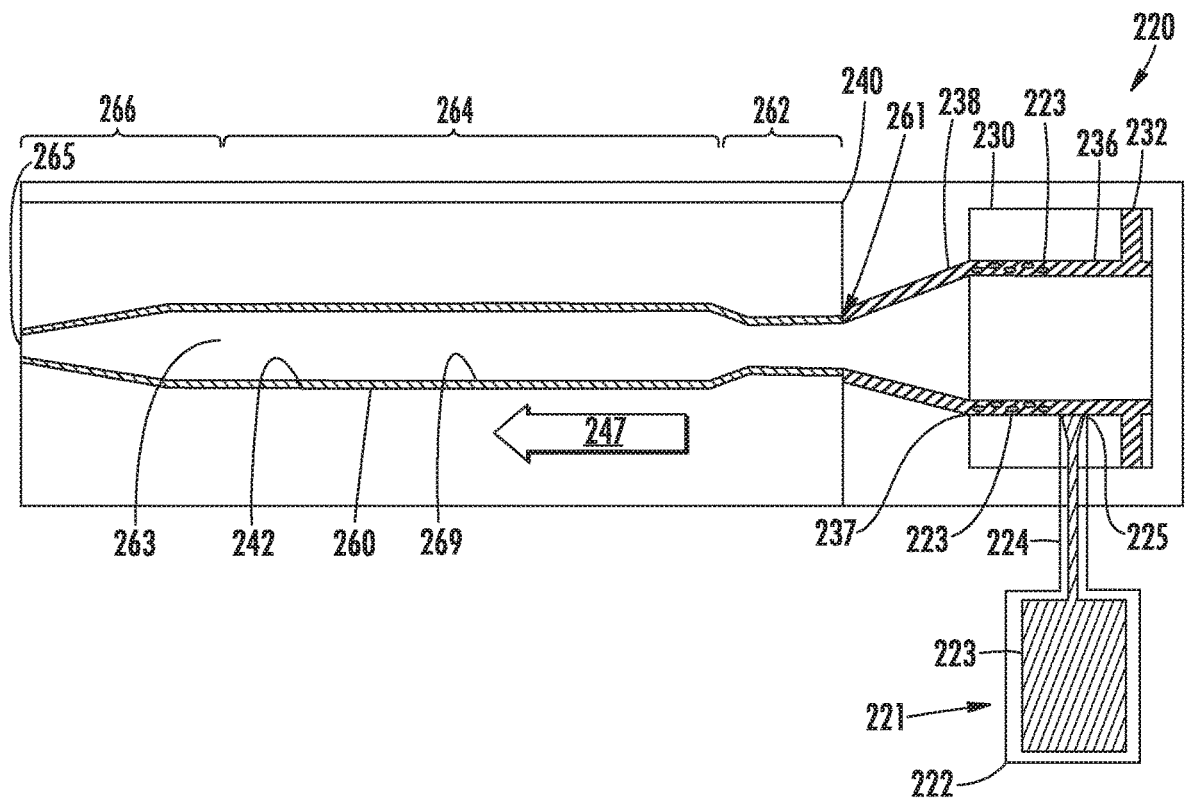
FIG. 9A is a schematic cross-sectional view illustration of a pipette fabrication apparatus including a material ejector injecting a flowable filter material precursor into a stream of molten thermoplastic material upstream of an extruder engaged in supplying thermoplastic material in tubular form to a mold cavity for forming a pipette.
Figure 9B:
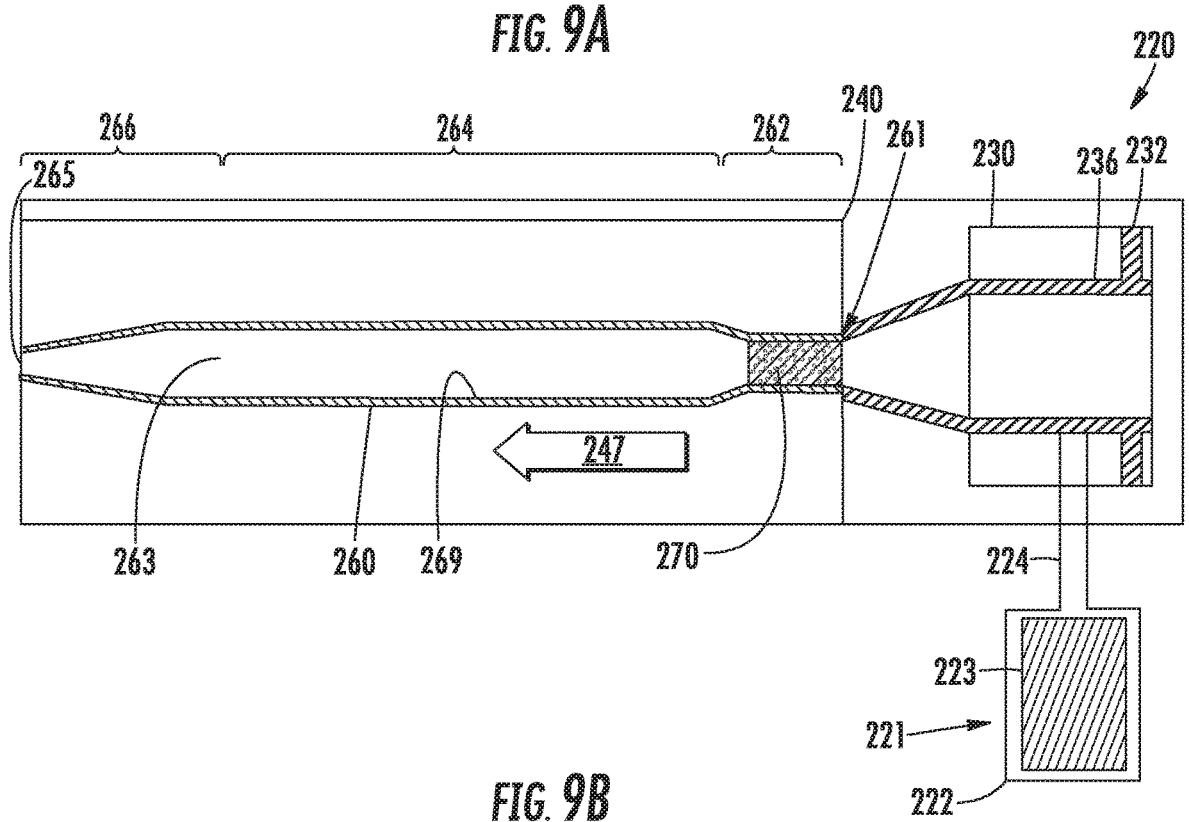
FIG. 9B is a schematic cross-sectional view illustration of the pipette fabrication apparatus of FIG. 9A, following formation of a filter element from the filter material precursor as the entirety of a mouthpiece region of a pipette arranged within the mold cavity.

FIGS. 9A and 9B illustrate the same apparatus 220 as described in connection with FIGS. 8A and 8B, but with a different pipette 260 formed therein due to presence of a porous filter element 270 embodying substantially the entirety of a mouthpiece region 262 of the pipette 260. The pipette 260 includes an inner surface 269 bounding a hollow interior 263. The apparatus 220 is suitable for fabricating a pipette 260 having a tubular body 264 positioned between a tip region 266 and a mouthpiece region 262, all positioned between a tip 265 and a mouthpiece end 261. The same elements previously described in connection with FIGS. 8A and 8B will not be described again for brevity. In FIG. 9A, the pipette fabrication apparatus 220 is shown supplying a stream 238 of extruded thermoplastic material 232 from an extruder 230 to a mold 240. Just prior to formation of the mouthpiece region 262, flowable filter material precursor 223 within the extruder 230 is injected into internal passages 236 upstream of the extruder outlet 237, resulting in presence of a combination of flowable filter material precursor 223 and extruded thermoplastic material 232. When the material combination is supplied to the mold 240, the extruder output may be increased and/or a line of mold assembly segments may be adjusted, and any vacuum or air pressure used to form a pressure differential for forming a mouthpiece is disabled, to cause an entirety (or substantially an entirety) of the hollow interior 263 in the mouthpiece portion 262 to be filled. When cooled, the flowable filter material precursor 223 expands and causes the entire mouthpiece portion 262 to become a porous filter 270, as shown in FIG. 9B. This porous filter 270 is therefore integral with an internal wall 269 on or adjacent to the mouthpiece portion 262.

In accordance with embodiments disclosed herein, a method for fabricating a pipette comprises supplying a heated thermoplastic material forming a tubular wall into a mold cavity, wherein the tubular wall bounds a hollow interior. The method further comprises supplying a filter material or a filter material precursor into at least a portion of the hollow interior while the thermoplastic material is at an elevated temperature (e.g., within a softening temperature of the thermoplastic material) within the mold cavity. The method further comprises allowing the thermoplastic material to cool and solidify to form a pipette comprising a tubular body arranged between a tip region and a mouthpiece region, with a filter element corresponding to the filter material or the filter material precursor being bound to or encapsulated in an inner wall of the mouthpiece region.

In certain embodiments, the foregoing method includes supplying a filter material embodying a prefabricated, discrete filter element in solid form into the at least a portion of the hollow interior. In certain embodiments, the prefabricated, discrete filter element comprises a polymeric foam material.

In certain embodiments, a filter material precursor may be injected into the at least a portion of the hollow interior. A filter material precursor may be embodied in a polymeric foam-forming composition that comprises a liquid constituent. In certain embodiments, a filter material precursor comprises a foamable thermoplastic composition and a blowing agent, such as a chemical blowing agent or a physical blowing agent.

In certain embodiments, a longitudinal axis is definable along a center of the tubular wall, and the filter material precursor is injected into the at least a portion of the hollow interior in a direction substantially parallel to or coincident with the longitudinal axis. For example, a filter material precursor may be injected coincident with the longitudinal axis into the hollow interior, and heated, softened thermoplastic material may be supplied to the hollow interior in a tubular shape surrounding a filter material injector. In certain embodiments, a filter material precursor is injected into the at least a portion of the hollow interior through the tubular wall and in a direction non-parallel to the longitudinal axis.

In certain embodiments, heated thermoplastic material may be supplied as a stream of molten thermoplastic material through an outlet of an extruder into the mold cavity. Optionally, a liquid-containing filter material precursor may be supplied through the same outlet of the extruder into the mold cavity, such as by supplying the precursor into an extruder channel to contact the molten thermoplastic material. In certain embodiments, the outlet of the extruder comprises an annular outlet.

In certain embodiments, the pipette fabrication method includes establishing a pressure differential between the hollow interior and the mold cavity to cause at least a portion of the tubular wall to expand into contact with a molding surface of the mold cavity.

In certain embodiments, the pipette fabrication method includes deferring or suspending establishment of a pressure differential between the hollow interior and the mold cavity after said flowing of the liquid filter material precursor through the outlet of the extruder into the mold cavity to cause a portion of the tubular wall to collapse around a filter element comprising the liquid filter material precursor in the mouthpiece region.

In accordance with embodiments disclosed herein, a pipette comprises a tubular body arranged between a tip region and a mouthpiece region, and having a longitudinal axis extending between the tip and the mouthpiece, and a filter element comprising a foamed polymeric material within the mouthpiece region, wherein an outer portion of the filter element is bound to or encapsulated in an inner wall of the mouthpiece region.

In certain embodiments, an outer portion of the filter element is interpenetrably bound to the inner wall of the mouthpiece region. As used herein, the term "interpenetrably bound" refers to the condition of two adjacent polymer-containing surfaces being joined to one another with at least some polymer chains of both surfaces being linked to the other. In certain embodiments, binding between a filter element and an inner wall of the mouthpiece region is adhesiveless.

In certain embodiments, the foamed polymeric material comprises a thermoset foam material, or a crosslinking foam material. In certain embodiments, the foamed polymeric material comprises foamed polystyrene. In certain embodiments, the foamed polymeric material comprises an open-cell foam having an open cell content of at least 50%.

In certain embodiments, the tubular body may comprise thermoplastic material, preferably being biaxially oriented. In certain embodiments, a nominal thickness of the tubular body is in a range of from about 0.25 mm to about 1 mm.

In certain embodiments, the tubular body, the tip region, and the mouthpiece region are unitary in character and devoid of any weld seams. Weld seams may create undesirable residue or particulate in the resulting pipette, and may also create bumps or ridges that may accumulate fluid and contaminants inside a pipette.

In accordance with embodiments disclosed herein, an apparatus for fabricating a pipette having a filter comprises an extrusion die, a mold, and a material ejector. The extrusion die is configured to generate flowable thermoplastic material forming a thermoplastic tube having a tubular wall bounding a hollow interior. The mold defines a mold cavity configured to receive the thermoplastic tube, and the material ejector is configured to supply a filter material or a filter material precursor into at least a portion of the hollow interior while the thermoplastic tube is within the mold cavity.

In certain embodiments, the material ejector is configured to supply a filter material embodying a prefabricated, discrete filter element in solid form into the at least a portion of the hollow interior. In certain embodiments, the material ejector is configured to inject a filter material precursor in flowable form into the at least a portion of the hollow interior.

In certain embodiments, a longitudinal axis is definable along a center of the tubular wall, and the material ejector comprises an outlet configured to eject a filter material precursor in flowable form into the at least a portion of the hollow interior in a direction substantially parallel to or coincident with the longitudinal axis. In certain embodiments, the material ejector comprises an outlet configured to eject a filter material precursor in flowable form into the at least a portion of the hollow interior through the tubular wall and in a direction non-parallel to (e.g., perpendicular to) the longitudinal axis.

In certain embodiments, the material ejector is coupled with a supply of filter material precursor embodied in a polymeric foam-forming composition that comprises a liquid constituent. In certain embodiments, the material ejector is coupled with a supply of filter material precursor embodied in a foamable thermoplastic composition and a blowing agent.

In certain embodiments, the extrusion die comprises extrusion die outlet, and the material ejector is configured to supply a filter material precursor through the extrusion die outlet into the at least a portion of the hollow interior. In certain embodiments, the mold cavity comprises a plurality of gas outlets configured to enable escape of gas from the mold cavity upon establishment of a pressure differential across the tubular wall sufficient to cause at least a portion of the tubular wall to expand into contact with a molding surface of the mold cavity.

According to an aspect (1) of the present disclosure, a pipette is provided. The pipette comprises: a tubular body arranged between a tip region and a mouthpiece region, and having a longitudinal axis extending between the tip and the mouthpiece; and a filter element comprising a foamed polymeric material within the mouthpiece region, wherein an outer portion of the filter element is bound to or encapsulated in an inner wall of the mouthpiece region.

According to an aspect (2) of the present disclosure, the pipette of aspect (1) is provided, wherein the outer portion of the filter element is interpenetrably bound to the inner wall of the mouthpiece region.

According to an aspect (3) of the present disclosure, the pipette of any of aspects (1)-(2) is provided, wherein the foamed polymeric material comprises a thermoset foam material.

According to an aspect (4) of the present disclosure, the pipette of any of aspects (1)-(2) is provided, wherein the foamed polymeric material comprises a crosslinking foam material.

According to an aspect (5) of the present disclosure, the pipette of any of aspects (1)-(2) is provided, wherein the foamed polymeric material comprises foamed polystyrene.

According to an aspect (6) of the present disclosure, the pipette of any of aspects (1)-(5) is provided, wherein the foamed polymeric material comprises an open-cell foam having an open cell content of at least 50%.

According to an aspect (7) of the present disclosure, the pipette of any of aspects (1)-(6) is provided, wherein a nominal thickness of the tubular body is in a range of from about 0.25 mm to about 1 mm.

According to an aspect (8) of the present disclosure, the pipette of any of aspects (1)-(7) is provided, wherein the tubular body comprises thermoplastic material.

According to an aspect (9) of the present disclosure, the pipette of aspect (8) is provided, wherein the thermoplastic material is biaxially oriented.

According to an aspect (10) of the present disclosure, the pipette of any of aspects (1)-(9) is provided, wherein the tubular body, the tip region, and the mouthpiece region are unitary and devoid of any weld seam.

According to an aspect (11) of the present disclosure, a method for fabricating a pipette is provided. The method comprises: supplying a heated thermoplastic material forming a tubular wall into a mold cavity, wherein the tubular wall bounds a hollow interior; supplying a filter material or a filter material precursor into at least a portion of the hollow interior while the heated thermoplastic material is at an elevated temperature within the mold cavity; and allowing the heated thermoplastic material to cool and solidify to form a pipette comprising a tubular body arranged between a tip region and a mouthpiece region, with a filter element corresponding to the filter material or the filter material precursor being bound to or encapsulated in an inner wall of the mouthpiece region.

According to an aspect (12) of the present disclosure, the method of aspect (11) is provided, wherein said supplying of a filter material or a filter material precursor into the at least a portion of the hollow interior comprises supplying a filter material embodying a prefabricated, discrete filter element in solid form into the at least a portion of the hollow interior.

According to an aspect (13) of the present disclosure, the method of aspect (12) is provided, wherein the prefabricated, discrete filter element comprises a polymeric foam material.

According to an aspect (14) of the present disclosure, the method of aspect (11) is provided, wherein said supplying of a filter material or a filter material precursor into the at least a portion of the hollow interior comprises injecting a filter material precursor into the at least a portion of the hollow interior.

According to an aspect (15) of the present disclosure, the method of aspect (14) is provided, wherein the filter material precursor is embodied in a polymeric foam-forming composition that comprises a liquid constituent.

According to an aspect (16) of the present disclosure, the method of aspect (14) is provided, wherein the filter material precursor comprises a foamable thermoplastic composition and a blowing agent.

According to an aspect (17) of the present disclosure, the method of aspect (16) is provided, wherein the blowing agent comprises a chemical blowing agent.

According to an aspect (18) of the present disclosure, the method of aspect (16) is provided, wherein the blowing agent comprises a physical blowing agent.

According to an aspect (19) of the present disclosure, the method of aspect (14) is provided, wherein a longitudinal axis is definable along a center of the tubular wall, and the filter material precursor is injected into the at least a portion of the hollow interior in a direction substantially parallel to or coincident with the longitudinal axis.

According to an aspect (20) of the present disclosure, the method of aspect (14) is provided, wherein a longitudinal axis is definable along a center of the tubular wall, and the filter material precursor is injected into the at least a portion of the hollow interior through the tubular wall and in a direction non-parallel to the longitudinal axis.

According to an aspect (21) of the present disclosure, the method of any of aspects (11)-(20) is provided, wherein said supplying of the heated thermoplastic material comprises flowing a stream of molten thermoplastic material through an outlet of an extruder into the mold cavity.

According to an aspect (22) of the present disclosure, the method of aspect (21) is provided, wherein said supplying of a filter material or a filter material precursor into the at least a portion of the hollow interior comprises flowing a liquid filter material precursor through the outlet of the extruder into the mold cavity.

According to an aspect (23) of the present disclosure, the method of aspect (22) is provided, wherein the outlet of the extruder comprises an annular outlet.

According to an aspect (24) of the present disclosure, the method of aspect (22) is provided, further comprising deferring or suspending establishment of a pressure differential between the at least a portion of the hollow interior and the mold cavity after said flowing of the liquid filter material precursor through the outlet of the extruder into the mold cavity to cause a portion of the tubular wall to collapse around a filter element comprising the liquid filter material precursor in the mouthpiece region.

According to an aspect (25) of the present disclosure, the method of any of aspects (11)-(20) is provided, further comprising establishing a pressure differential between the at least a portion of the hollow interior and the mold cavity to cause at least a portion of the tubular wall to expand into contact with a molding surface of the mold cavity.

According to an aspect (26) of the present disclosure, the method of any of aspects (11)-(25) is provided, wherein the elevated temperature is within a softening temperature of the thermoplastic material.

According to an aspect (27) of the present disclosure, an apparatus for fabricating a pipette having a filter is provided. The apparatus comprises: an extrusion die configured to generate flowable thermoplastic material forming a thermoplastic tube having a tubular wall bounding a hollow interior; a mold defining a mold cavity configured to receive the thermoplastic tube; and a material ejector configured to supply a filter material or a filter material precursor into at least a portion of the hollow interior while the thermoplastic tube is within the mold cavity.

According to an aspect (28) of the present disclosure, the apparatus of aspect (27) is provided, wherein the material ejector is configured to supply a filter material embodying a prefabricated, discrete filter element in solid form into the at least a portion of the hollow interior.

According to an aspect (29) of the present disclosure, the apparatus of aspect (27) is provided, wherein the material ejector is configured to inject a filter material precursor in flowable form into the at least a portion of the hollow interior.

According to an aspect (30) of the present disclosure, the apparatus of any of aspects (27)-(29) is provided, wherein: a longitudinal axis is definable along a center of the tubular wall; and the material ejector comprises an outlet configured to eject a filter material precursor in flowable form into the at least a portion of the hollow interior in a direction substantially parallel to or coincident with the longitudinal axis.

According to an aspect (31) of the present disclosure, the apparatus of any of aspects (27)-(29) is provided, wherein: a longitudinal axis is definable along a center of the tubular wall; and the material ejector comprises an outlet configured to eject the filter material precursor in flowable form into the at least a portion of the hollow interior through the tubular wall and in a direction non-parallel to the longitudinal axis.

According to an aspect (32) of the present disclosure, the apparatus of any of aspects (27)-(31) is provided, wherein the material ejector is coupled with a supply of filter material precursor embodied in a polymeric foam-forming composition that comprises a liquid constituent.

According to an aspect (33) of the present disclosure, the apparatus of any of aspects (27)-(31) is provided, wherein the material ejector is coupled with a supply of filter material precursor embodied in a foamable thermoplastic composition and a blowing agent.

According to an aspect (34) of the present disclosure, the apparatus of any of aspects (27)-(33) is provided, wherein the extrusion die comprises extrusion die outlet, and the material ejector is configured to supply a filter material precursor through the extrusion die outlet into the at least a portion of the hollow interior.

According to an aspect (35) of the present disclosure, the apparatus of any of aspects (27)-(34) is provided, wherein the mold cavity comprises a plurality of gas outlets configured to enable escape of gas from the mold cavity upon establishment of a pressure differential across the tubular wall sufficient to cause at least a portion of the tubular wall to expand into contact with a molding surface of the mold cavity.

In further aspects of the disclosure, it is specifically contemplated that any two or more aspects, embodiments, or features disclosed herein may be combined for additional advantage.

As used herein, the singular forms "a," "an" and "the" include plural referents unless the context clearly dictates otherwise. Thus, for example, reference to a "notch" includes examples having two or more such "notches" unless the context clearly indicates otherwise.

The term "include" or "includes" means encompassing but not limited to, that is, inclusive and not exclusive.

"Optional" or "optionally" means that the subsequently described event, circumstance, or component, can or cannot occur, and that the description includes instances where the event, circumstance, or component, occurs and instances where it does not.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred. Any recited single or multiple feature or aspect in any one claim can be combined or permuted with any other recited feature or aspect in any other claim or claims.

It is also noted that recitations herein refer to a component being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

While various features, elements or steps of particular embodiments may be disclosed using the transitional phrase "comprising," it is to be understood that alternative embodiments, including those that may be described using the transitional phrases "consisting" or "consisting essentially of" are implied.

It will be apparent to those skilled in the art that various modifications and variations can be made to the present inventive technology without departing from the spirit and scope of the disclosure. Since modifications, combinations, sub-combinations and variations of the disclosed embodiments incorporating the spirit and substance of the inventive technology may occur to persons skilled in the art, the inventive technology should be construed to include everything within the scope of the appended claims and their equivalents.

What is claimed is:

1. A pipette comprising:
   a tubular body arranged between a tip region and a mouthpiece region, and having a longitudinal axis extending between the tip and the mouthpiece; and
   a filter element comprising a foamed polymeric material within the mouthpiece region, wherein an outer portion of the filter element is bound to or encapsulated in an inner wall of the mouthpiece region, and wherein the foamed polymeric material comprises an open-cell foam having an open cell content of at least 50%.

2. The pipette of claim 1, wherein the outer portion of the filter element is interpenetrably bound to the inner wall of the mouthpiece region.

3. The pipette of claim 1, wherein the foamed polymeric material comprises at least one of a thermoset foam material, a crosslinking foam material, and foamed polystyrene.

4. The pipette of claim 1, wherein a nominal thickness of the tubular body is in a range of from about 0.25 mm to about 1 mm.

5. The pipette of claim 1, wherein the tubular body comprises thermoplastic material that is biaxially oriented.

6. The pipette of claim 1, wherein the tubular body, the tip region, and the mouthpiece region are unitary and devoid of any weld seam.

7. A method for fabricating a pipette, the method comprising:
   supplying a heated thermoplastic material forming a tubular wall into a mold cavity, wherein the tubular wall bounds a hollow interior;
   supplying a filter material or a filter material precursor into at least a portion of the hollow interior while the heated thermoplastic material is at an elevated temperature within the mold cavity; and
   allowing the heated thermoplastic material to cool and solidify to form a pipette comprising a tubular body arranged between a tip region and a mouthpiece region, with a filter element corresponding to the filter material or the filter material precursor being bound to or encapsulated in an inner wall of the mouthpiece region.

8. The method for fabricating a pipette of claim 7, wherein said supplying of a filter material or a filter material precursor into the at least a portion of the hollow interior comprises supplying a filter material embodying a prefabricated, discrete filter element in solid form into the at least a portion of the hollow interior.

9. The method of claim 7, wherein said supplying of a filter material or a filter material precursor into the at least a portion of the hollow interior comprises injecting a filter material precursor into the at least a portion of the hollow interior.

10. The method of claim 9, wherein the filter material precursor is embodied in a polymeric foam-forming composition that comprises a liquid constituent.

11. The method of claim 9, wherein the filter material precursor comprises a foamable thermoplastic composition and a blowing agent.

12. The method of claim 11, wherein the blowing agent comprises a chemical blowing agent or a physical blowing agent.

13. The method of claim 9, wherein a longitudinal axis is definable along a center of the tubular wall, and the filter material precursor is injected into the at least a portion of the hollow interior (i) in a direction substantially parallel to or coincident with the longitudinal axis, or (ii) through the tubular wall and in a direction non-parallel to the longitudinal axis.

14. The method of claim 7, wherein said supplying of the heated thermoplastic material comprises flowing a stream of molten thermoplastic material through an outlet of an extruder into the mold cavity.

15. The method of claim 14, wherein said supplying of a filter material or a filter material precursor into the at least a portion of the hollow interior comprises flowing a liquid filter material precursor through the outlet of the extruder into the mold cavity.

16. The method of claim 15, further comprising deferring or suspending establishment of a pressure differential between the at least a portion of the hollow interior and the mold cavity after said flowing of the liquid filter material precursor through the outlet of the extruder into the mold cavity to cause a portion of the tubular wall to collapse around a filter element comprising the liquid filter material precursor in the mouthpiece region.

17. The method of claim 7, further comprising establishing a pressure differential between the at least a portion of the hollow interior and the mold cavity to cause at least a portion of the tubular wall to expand into contact with a molding surface of the mold cavity.

18. The method of claim 7, wherein the elevated temperature is within a softening temperature of the thermoplastic material.

19. An apparatus for fabricating a pipette having a filter, the apparatus comprising:
   an extrusion die configured to generate flowable thermoplastic material forming a thermoplastic tube having a tubular wall bounding a hollow interior;
   a mold defining a mold cavity configured to receive the thermoplastic tube; and
   a material ejector configured to supply a filter material embodying a prefabricated, discrete filter element in solid form into at least a portion of the hollow interior while the thermoplastic tube is within the mold cavity.

20. The apparatus of claim 19, wherein the material ejector is configured to inject the filter material into the at least a portion of the hollow interior.

21. The apparatus of claim 19, wherein the extrusion die comprises extrusion die outlet, and the material ejector is configured to supply the filter material through the extrusion die outlet into the at least a portion of the hollow interior.

22. The apparatus of claim 19, wherein the mold cavity comprises a plurality of gas outlets configured to enable escape of gas from the mold cavity upon establishment of a pressure differential across the tubular wall sufficient to cause at least a portion of the tubular wall to expand into contact with a molding surface of the mold cavity.

23. A pipette comprising:
a tubular body having a nominal thickness in a range of from about 0.25 mm to about 1 mm, the tubular body arranged between a tip region and a mouthpiece region, and having a longitudinal axis extending between the tip and the mouthpiece; and
a filter element comprising a foamed polymeric material within the mouthpiece region, wherein an outer portion of the filter element is bound to or encapsulated in an inner wall of the mouthpiece region.

24. The pipette of claim 23, wherein the outer portion of the filter element is interpenetrably bound to the inner wall of the mouthpiece region.

25. The pipette of claim 23, wherein the foamed polymeric material comprises at least one of a thermoset foam material, a crosslinking foam material, and foamed polystyrene.

26. The pipette of claim 23, wherein the tubular body, the tip region, and the mouthpiece region are unitary and devoid of any weld seam.

27. A pipette comprising:
a tubular body comprising a thermoplastic material that is biaxially oriented, the tubular body arranged between a tip region and a mouthpiece region, and having a longitudinal axis extending between the tip and the mouthpiece; and
a filter element comprising a foamed polymeric material within the mouthpiece region, wherein an outer portion of the filter element is bound to or encapsulated in an inner wall of the mouthpiece region.

28. The pipette of claim 27, wherein a nominal thickness of the tubular body is in a range of from about 0.25 mm to about 1 mm.

29. The pipette of claim 27, wherein the outer portion of the filter element is interpenetrably bound to the inner wall of the mouthpiece region.

30. The pipette of claim 27, wherein the foamed polymeric material comprises at least one of a thermoset foam material, a crosslinking foam material, and foamed polystyrene.

31. The pipette of claim 27, wherein the tubular body, the tip region, and the mouthpiece region are unitary and devoid of any weld seam.

* * * * *